(12) United States Patent
Kim (10) Patent No.: US 12,012,071 B2
(45) Date of Patent: *Jun. 18, 2024

(54) METHOD FOR UNLOCKING VEHICLE DOOR USING MOBILE TERMINAL

(71) Applicant: Allink Co., Ltd., Seoul (KR)

(72) Inventor: Kyung Dong Kim, Seongnam-si (KR)

(73) Assignee: Allink Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/131,880

(22) Filed: Apr. 7, 2023

(65) Prior Publication Data

US 2023/0242073 A1 Aug. 3, 2023

Related U.S. Application Data

(63) Continuation of application No. 17/428,981, filed as application No. PCT/KR2021/008121 on Jun. 28, 2021, now Pat. No. 11,623,612.

(30) Foreign Application Priority Data

Jun. 29, 2020 (KR) ........................ 10-2020-0079340

(51) Int. Cl.
*B60R 25/24* (2013.01)
*B60R 25/01* (2013.01)
*E05B 81/78* (2014.01)

(52) U.S. Cl.
CPC .............. *B60R 25/24* (2013.01); *B60R 25/01* (2013.01); *E05B 81/78* (2013.01); *B60R 2325/205* (2013.01)

(58) Field of Classification Search
CPC ... B60R 25/24; B60R 25/01; B60R 2325/205; E05B 81/78
See application file for complete search history.

(56) References Cited

U.S. PATENT DOCUMENTS 9,530,295 B2 12/2016 Johnson
9,663,067 B2 5/2017 Penilla et al.
(Continued)

FOREIGN PATENT DOCUMENTS

| CN | 107685714 A | 2/2018 |
|---|---|---|
| KR | 10-1733453 B1 | 5/2017 |

(Continued)

*Primary Examiner* — Thomas D Alunkal
(74) *Attorney, Agent, or Firm* — Park, Kim & Suh, LLC (57) ABSTRACT

The present invention provides a method for unlocking a vehicle door using a mobile terminal. The unlocking method comprises: authenticating, by a mobile key management server, a user and a smartphone of the user; authenticating, by the mobile key management server, a vehicle having a door to be unlocked using the authenticated smartphone; generating, by the mobile key management server, a mobile key issuance algorithm corresponding to the authenticated vehicle and smartphone; issuing, by the mobile key management server, a mobile key, using the generated mobile key issuance algorithm, in response to a request from the smartphone; receiving, at the mobile key management server, the issued mobile key via the smartphone and the vehicle; confirming, by the mobile key management server, whether the issued mobile key matches the received mobile key; and requesting, by the mobile key management server, the vehicle to unlock the door thereof, when the issued mobile key matches the received mobile key.

20 Claims, 10 Drawing Sheets

(56) References Cited

U.S. PATENT DOCUMENTS

| | | |
|---|---|---|
| 10,569,739 B2 | 2/2020 | Pudar et al. |
| 11,623,612 B2* | 4/2023 | Kim .................. B60R 25/241 340/5.72 |
| 2003/0160681 A1 | 8/2003 | Menard et al. |
| 2003/0231103 A1 | 12/2003 | Fisher |
| 2012/0280790 A1 | 11/2012 | Gerhardt et al. |
| 2013/0259232 A1* | 10/2013 | Petel .................. H04W 12/06 455/411 |
| 2016/0098870 A1* | 4/2016 | Bergerhoff .............. H04W 4/48 340/5.61 |
| 2016/0189453 A1 | 6/2016 | Johnson et al. |
| 2017/0134382 A1* | 5/2017 | Darnell .................. H04L 67/12 |
| 2017/0174180 A1 | 6/2017 | Hoyos et al. |
| 2018/0062996 A1* | 3/2018 | Lei ...................... H04L 45/745 |
| 2018/0357846 A1* | 12/2018 | Chen .................. B60R 25/241 |
| 2019/0200183 A1 | 6/2019 | Endo et al. |
| 2019/0299932 A1* | 10/2019 | Porteret ................ G06V 40/10 |
| 2019/0359173 A1 | 11/2019 | Pudar et al. |
| 2021/0168602 A1* | 6/2021 | Kim ...................... B60R 25/01 |

FOREIGN PATENT DOCUMENTS

| | | |
|---|---|---|
| KR | 10-2017-0124755 A | 11/2017 |
| KR | 10-2019342 B1 | 9/2019 |
| WO | 2020/090232 A1 | 5/2020 |

\* cited by examiner

FIG. 1

Mobile key subscription
(Agreement on provision)

Provision of mobile key subscription

☐ I agree on the above provision

[Confirm]

(a)

Mobile key subscription
(Member information)

- ID
- Password
- Name
- Date of birth
- Mobile phone No.
- Email

[Confirm]

(b)

Mobile key subscription
(Identification)

- Name
- Mobile phone No.
- Date of birth
- Sex
- Communication service provider

[Request for authentication]

(c)

Mobile key subscription
(Authentication number)

Please enter received authentication number within predetermined time period.

[Confirm]

(d)

Mobile key subscription
(PIN registration)

Simple password (PIN) will be registered for mobile key request

- PIN
- Confirm PIN

[Confirm]

(e)

Mobile Key subscription
(Vehicle registration)

Please enter registration number of vehicle to be registered for mobile key service

324SA4949

[Confirm]

(f)

Mobile Key subscription
(Vehicle registration)

Owner of vehicle is OOO who is identical with you.

Will you register?

[Confirm]

(g)

Mobile Key subscription
(Vehicle authentication)

Please touch on NFC tag installed at vehicle with your phone.

(h)

Mobile Key subscription
(Vehicle authentication)

Please press confirmation button displayed on screen of vehicle.

[Confirm]

(i-1)

Mobile Key subscription
(Vehicle authentication)

Please enter authentication number displayed on screen of vehicle.

[Confirm]

(i-2)

Mobile key subscription
(Completion)

Mobile key service registration has been completed for vehicle 324SA4949.

[Confirm]

| ID | Password | Simple password (PIN) | Name | Mobile phone No. | Identification Information | Vehicle Registration No. | Vehicle Serial No. (VIN) | ID of mobile key issuance algorithm | ID of vehicle ID provider | Existence of shared key | Sharer information | Valid period |
|---|---|---|---|---|---|---|---|---|---|---|---|---|
| card923324 | ******* | ******* | Gildong HONG | 010-3843-4535 | 820621*** | 342NA 9485 | HD3858124 | 2231443 | A29348348 B45956348 C39485802 | × | | |
| her3596 | ******* | ******* | Mongryong LEE | 010-2343-8345 | 790830*** | 53BA 8354 | AE39435342 | J3R3943 | A93439545 B38582495 | ○ | 010-3774-8324 kd1234 | 4 days and 3 hours Until March 4, 12:00 |
| link3432 | ******* | ******* | Moonsoo PARK | 010-8542-8457 | 651108*** | 68AH 0342 | DW3492887 | OP9345 | A34834254 B83482859 | × | | |

FIG. 6

| Vehicle serial No. (VIN) | NFC tag ID |
|---|---|
| HD3858124 | A29348348 |
| | B45956348 |
| | C39485802 |
| AE39435342 | A93439545 |
| | B38582495 |
| DW3492887 | A34834254 |
| | B83482859 |

METHOD FOR UNLOCKING VEHICLE DOOR USING MOBILE TERMINAL

CROSS-REFERENCE TO RELATED APPLICATION

This application is a continuation of U.S. patent application Ser. No. 17/428,981 filed on Aug. 6, 2021, now U.S. Pat. No. 11,623,612, which is the National Stage filing under 35 U.S.C. 371 of International Application No. PCT/KR2021/008121, filed on Jun. 28, 2021, which claims the benefit of Korean Patent Application No. 10-2020-0079340, filed on Jun. 29, 2020, the contents of which are all hereby incorporated by reference herein in their entirety.

TECHNICAL FIELD

The present invention relates to a method for unlocking a vehicle door using a mobile key, and more particularly, to a technology for unlocking the vehicle door using a disposable or one-time mobile key.

BACKGROUND ART

As various technologies using mobile devices such as smartphones have been developed, the mobile devices can perform a function of a mobile key, in addition to a conventional phone call function. That is, a user can unlock or release a door lock of a vehicle or home using his or her mobile device without separately owning a car key.

This mobile key function is mainly implemented using a short range communication method such as a near field communication (NFC) provided in the smartphone. In general, the mobile key code stored in the smartphone is delivered to the vehicle, and the vehicle receives the key code and checks whether a key code registered in advance matches the received key code. If the registered key code and the received key code match, the vehicle unlocks the door.

According to such a prior art, in order to transmit the mobile key code stored in the smart phone to the vehicle, a receiver for receiving the mobile key code should be provided at a certain position of the vehicle such as a handle of the vehicle. Therefore, since it is required to install the receiver for each vehicle, the cost for manufacturing the receiver and installing the receiver on the vehicle increases, and the door configuration of the vehicle becomes complicated.

In addition, in case of Apple's iPhone among the smartphones, the use of the mobile key is fundamentally unavailable because Apple restricts the transmission of information such as the key code in the smartphone to any external devices through the NFC method for security reasons.

Furthermore, when a mobile key code having a fixed code value as in the prior art is applied, it is difficult to share the key code with a third party. That is, when the key code is transmitted to the third party such that the third party can unlock the vehicle door, the transmitted key code is not disposable and can be used continuously. Thus, if the third party transmits the received key code to other unauthorized third parties, security issues related to the vehicle may occur.

DISCLOSURE OF INVENTION

Technical Problem

The present invention is contemplated to solve problems in the prior art mentioned above. Thus, an object of the present invention is to enable a mobile key to be used without installing at a vehicle a receiving device for receiving the mobile key.

Another object of the present invention is to improve the security performance of the mobile key and share the mobile key with a third party by generating a mobile key value for a one-time use each time a door of a vehicle is unlocked.

Solution to Problem

To solve the above problems, the present invention provides a method for unlocking a vehicle door using a mobile terminal, the method comprising: authenticating, by a mobile key management server, a user and a smartphone of the user; authenticating, by the mobile key management server, a vehicle having a door to be unlocked using the authenticated smartphone; generating, by the mobile key management server, a mobile key issuance algorithm corresponding to the authenticated vehicle and smartphone; issuing, by the mobile key management server, a mobile key, using the generated mobile key issuance algorithm, in response to a request from the smartphone; receiving, at the mobile key management server, the issued mobile key via the smartphone and the vehicle; confirming, by the mobile key management server, whether the issued mobile key matches the received mobile key; and requesting, by the mobile key management server, the vehicle to unlock the door thereof, when the issued mobile key matches the received mobile key.

Details of examples or implementations will be described in the following with reference to the accompanying drawings. Other features will be apparent from the description and drawings, and from the claims.

Advantageous Effects of Invention

The method according to the present invention has the technical advantages as follows.

The present invention can effectively establish a mobile key service system by enabling the mobile key to be used without installing a separate and additional mobile key receiving device at the vehicle.

In addition, the present invention not only simplifies sharing of the mobile key with a third party, but also improves security capacity of the mobile key.

BRIEF DESCRIPTION OF DRAWINGS

The present invention will become more fully understood from the detailed description given herein below and the accompanying drawings, which are given by illustration only, and thus are not intended to limit the scope of the present Invention, wherein:

FIG. 1 illustrates an embodiment showing a screen of a user's smartphone in a registration or subscription process for using a mobile key according to the present invention;

BEST MODE FOR CARRYING OUT THE INVENTION

Description will now be given in detail according to examples disclosed herein, with reference to the accompanying drawings. For the sake of brief description with reference to the drawings, the same or equivalent components may be provided with the same reference numbers, and description thereof will not be repeated. In the following, any conventional art which is well-known to one of ordinary skill in the relevant art has generally been omitted for the sake of brevity. The accompanying drawings are used to help easily understand various technical features and it should be understood that the examples presented herein are not limited by the accompanying drawings. As such, the present invention should be construed to extend to any alterations, equivalents and substitutes in addition to those which are particularly set out in the accompanying drawings.

A singular representation may include a plural representation unless it represents a definitely different meaning from the context.

Terms such as "comprise", "include" or "have" are used herein and should be understood that they are intended to indicate an existence of several components, functions or steps, disclosed in the specification, and it is also understood that greater or fewer components, functions, or steps may likewise be utilized. Moreover, due to the same reasons, it is also understood that the present invention includes a combination of features, numerals, steps, operations, components, parts and the like partially omitted from the related or involved features, numerals, steps, operations, components and parts described using the aforementioned terms unless deviating from the intentions of the original disclosure.

FIG. 1 illustrates an embodiment showing a screen of a user's smartphone in a registration or subscription process for using a mobile key according to the present invention.

In order for a user to use a mobile key according to the present invention, the user's smartphone 11 should be registered with a mobile key management server 12 in advance. The smartphone 11 is an example of a mobile terminal and any other types of mobile terminal may replace the smartphone 11 without the modification of the method according to the present invention as described below. Further, the mobile key management server 12 comprises a server which is configured to store and update all the information for a mobile key service and is also configured to communicate with all the devices within a system for the mobile key service. Thus, the mobile key management server 12 is able to provide any required information in response to the requests of the devices within the mobile key service system. Such a mobile key management server 12 may be referred to as a "management server" briefly, if necessary.

When the user executes a mobile key application installed in the smart phone 11 to register the user's smart phone 11 at the mobile key management server 12, an agreement screen for subscription for a mobile key service is displayed first (FIG. 1(*a*)).

After the user agrees to a provision of the mobile key service, i.e., the terms and conditions thereof, a member information screen for registering the user is displayed (FIG. 1(*b*)), and when member information is entered and transmitted, an authentication procedure for identity verification (i.e., identification) is performed.

For user authentication, an identification information screen is displayed on the user's smartphone 11 (FIG. 1(*c*)), and when the user inputs identification information and performs an authentication request, an authentication number is transmitted to the user's smartphone 11. A window for inputting the authentication number is displayed on a screen of the user's smartphone 11 (FIG. 1(*d*)), and the user inputs the authentication number received at the smartphone 11 into the displayed window.

Meanwhile, in order to enhance the security, the user may additionally register a personal identification number (PIN) (FIG. 1(*e*)), and a procedure for authenticating the user using the registered PIN may be added for using the mobile key.

For registration of a vehicle using the mobile key, when a vehicle registration number input screen is displayed on the user's smartphone (FIG. 1(*f*)), the user enters the registration number of his or her vehicle to which the mobile key is registered or coupled and transmits the registration number so as to register the vehicle (FIG. 1(*g*)), using the smartphone 11. The vehicle registration number is a registration identifier that is a numeric or alphanumeric ID uniquely identifying the vehicle or vehicle owner within the issuing region's vehicle register or agency. Such a vehicle registration number appears on a number plate or a license plate attached on the vehicle and thus is referred to as a license number.

After performing the smartphone and vehicle registration, the user approaches the user's smartphone 11 to a handle of the vehicle to which a vehicle ID provider is installed, according to a guide displayed on the smartphone 11 (FIG. 1(*h*)) to read vehicle identification information. In this case, the vehicle ID provider is preferably implemented as a near field communication (NFC) tag, but may be implemented in various ways such as a quick response (QR) code or a barcode.

To perform vehicle authentication, the mobile key management server 12 may receive an authentication number directly from the vehicle. Alternatively, to perform the vehicle authentication, the authentication number may be transmitted to the vehicle by the mobile key management server 12, and then the user may transmit the mobile key received at the vehicle to the management server 12, using the smartphone 11.

In order for the mobile key management server 12 to receive the authentication number directly from the vehicle, a screen which includes a confirmation button for transmitting the mobile key is displayed on a display device in the vehicle, and a screen that guides the user to press the confirmation button on the display device of the vehicle is displayed on the user's smartphone 11 (FIG. 1(*i*-1)).

On the other hand, in order for the user to transmits the authentication number to the mobile key management server 12 through the smartphone 11, the authentication number transmitted from the mobile key management server 12 is displayed on the display device of the vehicle, and then a screen for guiding the transmission of the authentication number to the mobile key management server 12 is displayed on the smartphone 11 (FIG. 1(*i*-2)).

When the vehicle authentication is completed, a message informing the completion of the mobile key service registration (or subscription) is displayed on the smartphone 11 (FIG. 1(*j*)).

Figure 2:
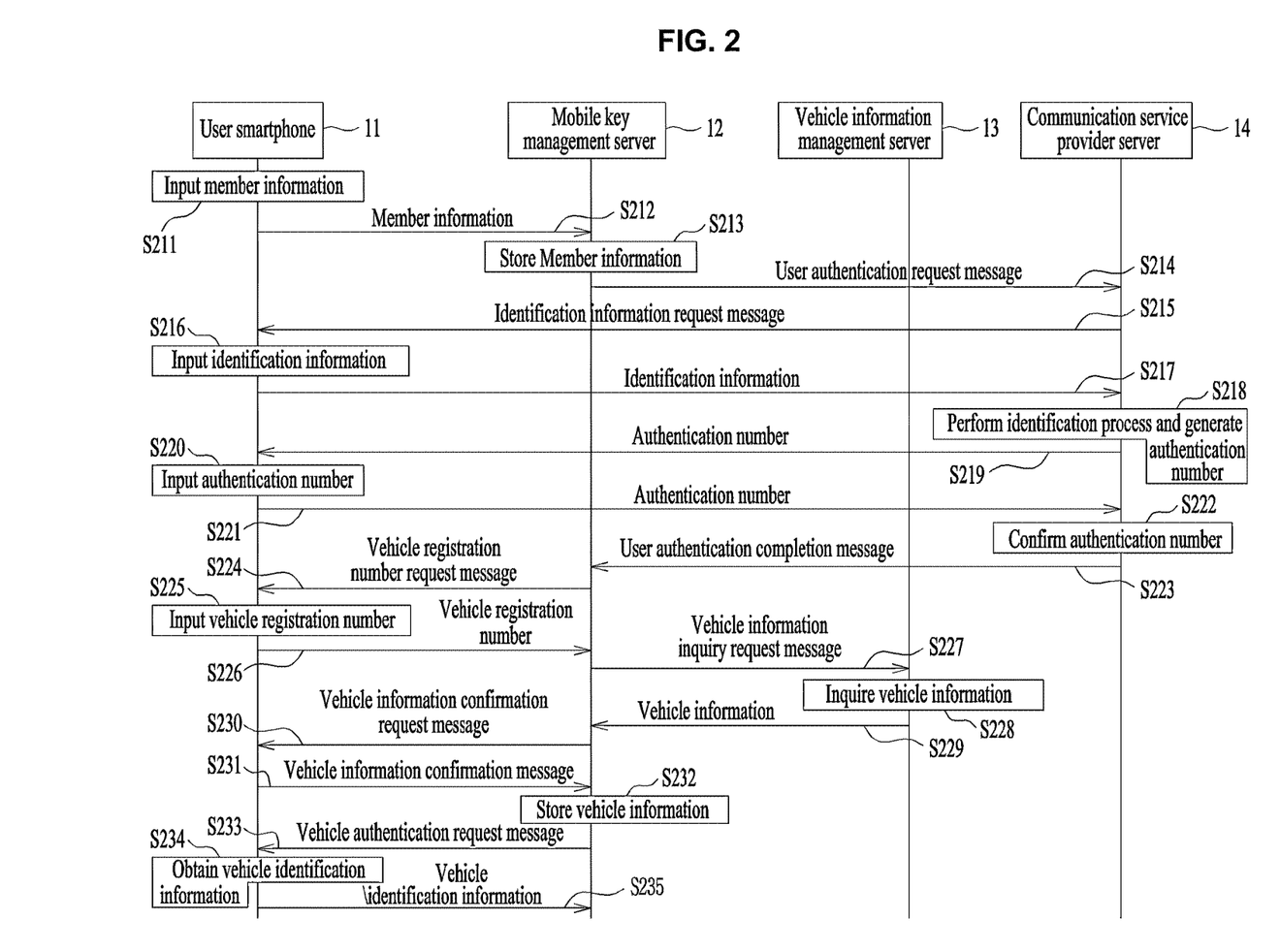
FIGS. 2 and 3 illustrate a first embodiment of a mobile key service registration method according to the present invention.
Figure 3:
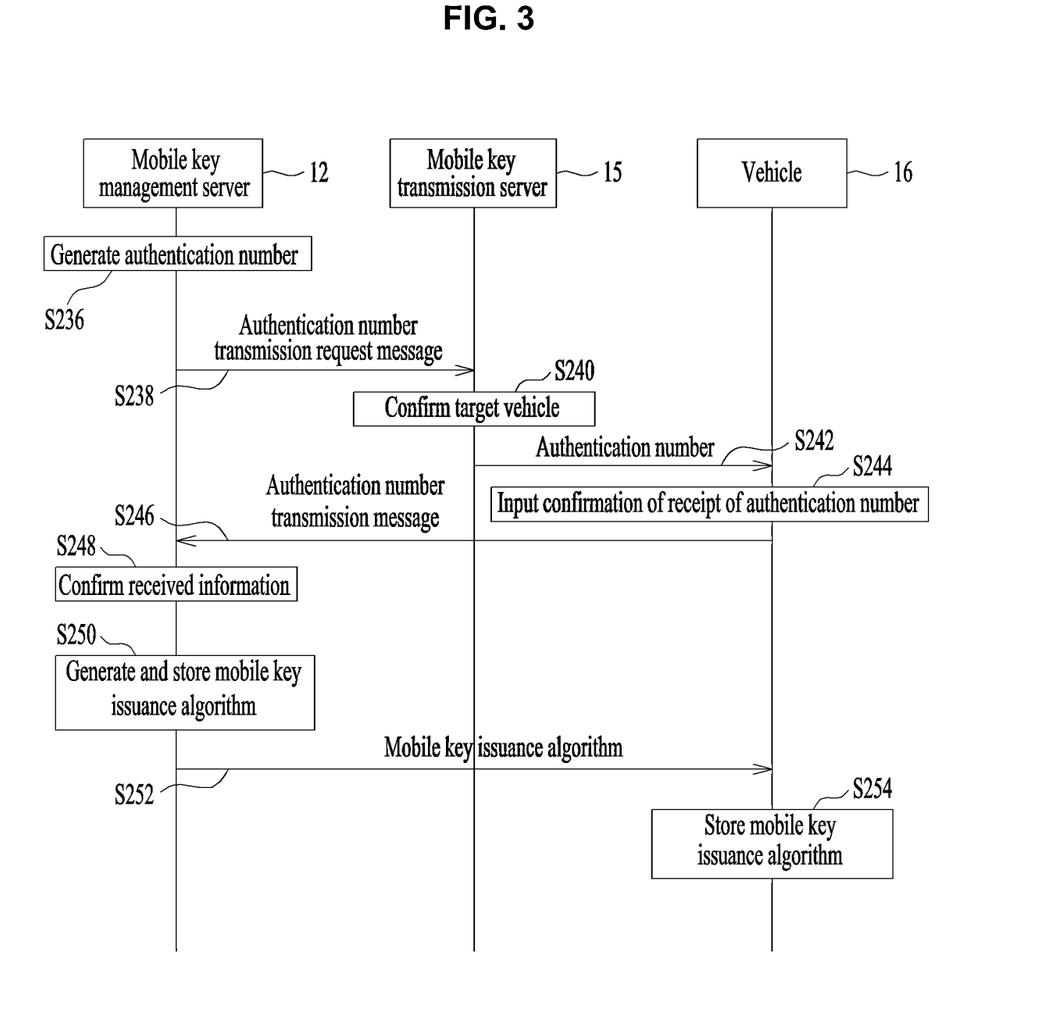

FIGS. 2 and 3 illustrate a first embodiment of a mobile key service registration method according to the present invention.

When the user installs the smart key application on the user's smartphone 11 for the mobile key registration and inputs the member information for the subscription for the mobile key service (S211), the user's smartphone 11 transmits the member information to the mobile key management server 12 (S212). The mobile key management server 12 stores the member information received from the user's smartphone 11 (S213), and transmits a user authentication request message to a communication service provider server 14 (hereinafter, referred to as "service provider server 14") for the identification of the user of the smartphone 11 (S214). The communication service provider is a company which commercially provides any type of communication service including a mobile communication service to a subscriber, and the service provider server 14 is a server of such a company which contains all the information of the subscriber to provide the communication service only to the authenticated subscriber. Thus, the service provider server 14 is able to authenticate the subscriber, i.e., the user of the smartphone 11, upon request. Although a process of performing the user authentication via the service provider server 14 will be described in this embodiment, the user authentication may be performed via a separate user authentication server, instead of the service provider server 14.

The service provider server 14 transmits an identification information request message to the user's smartphone 11 (S215). When the user enters the identification information (S216), the user's smartphone 11 transmits the identification information to the service provider server 14 (S217). The service provider server 14 performs an identification procedure using the identification information received from the user's smartphone 11, and generates an authentication number (S218) and transmits the authentication number to the user's smartphone 11 (S219). When the user inputs into a screen displayed on the smartphone 11 the authentication number received at the user's smartphone 11 (S220) and transmits the authentication number to the service provider server 14 (S221), the service provider server 14 checks whether the authentication number (S221) received from the smartphone 11 matches the authentication number (S218) generated by the server 14 (S222). If the service provider server 14 confirms the matching of the received and generated authentication numbers and thus also confirms that the identified user is using or possessing the smartphone 11, the user authentication completion message is transmitted to the mobile key management server 12 (S223).

When the user authentication is completed and the mobile key management server 12 receives the user authentication completion message from the service provider server 14 (S223), the server 12 transmits a vehicle registration number request message to the user's smartphone 11 for the vehicle registration (S224). When the user inputs the vehicle registration number into the smartphone 11 (S225), the smartphone 11 transmits the inputted registration number to the mobile key management server 12 (S226).

The mobile key management server 12 transmits a message including a request to inquire vehicle information, along with the received vehicle registration number to a vehicle information management server 13 in which registration information of the vehicle is stored, in order to check owner information of the vehicle (S227). The vehicle information management server 13 contains all the information of the vehicle which is registered to operate on a road of a certain region or country. For example, the vehicle information management server 13 may be a server of a government agency which is entitled to register and manage the vehicle for the proper operation.

The vehicle information management server 13 inquires into or searches for the stored registration information (S228), and transmits various vehicle information including the owner of the vehicle to the mobile key management server 12 (S229). The mobile key management server 12 transmits to the user's smartphone 11 a message including a request to confirm the vehicle information, along with the vehicle information (S229) received from the vehicle information management server 13, to confirm the vehicle information (S230).

When the user confirms the vehicle information received from the mobile key management server 12 via the smartphone 11, the user smartphone 11 transmits a message including a confirmation of the vehicle information to the mobile key management server 12 (S231).

When the mobile key management server 12 stores the received vehicle information and the member information corresponding thereto (S232), the server 12 transmits a message including a request to authenticate the vehicle, to obtain vehicle identification information corresponding to the vehicle information and the member information and also to authenticate the vehicle for which the mobile key service is applied, using the vehicle identification information (S233).

Upon receiving the vehicle authentication request message, the user's smartphone 11 displays a message requesting that the user acquires and transmits the vehicle identification information. The user obtains the vehicle identification information from a vehicle ID provider already installed near a door or a handle of the vehicle by using the user's smartphone 11 (S234) and transmits the vehicle identification information to the mobile key management server 12 (S235).

The vehicle ID provider is configured to transmit the vehicle identification information which allows the corresponding vehicle to be directly and instantly identified or recognized within the mobile key service system and method, in response to a predetermined manipulation on the smartphone. The vehicle ID provider may be implemented in various ways, such as a QR code, a barcode, and a NFC tag, but it is most preferable to implement the vehicle ID provider with the NFC tag for user convenience. When the vehicle ID provider is implemented as the NFC tag, the user conveniently acquires the vehicle identification information by simply approaching the smartphone 11 to or contacting the smartphone 11 on the NFC tag provided at the vehicle, and subsequently transmits the vehicle identification information to the mobile key management server 12.

Referring to FIG. 3, the mobile key management server 12 that has received the vehicle identification information from the user's smartphone 11 generates an authentication number corresponding to the received vehicle identification information (S236). Then, the server 12 transmits a message including a request to transmit the authentication number, along with the generated authentication number and the vehicle identification information, to a mobile key transmission server 15 (S238). The mobile key transmission server 15 stores various identification information for a certain vehicle including the vehicle identification information mentioned above, and thus is able to identify a specific vehicle using such information and the provided vehicle identification information. Accordingly, upon receiving request, the mobile key transmission server 15 is able to transmit any data to the identified vehicle corresponding to the provided vehicle identification information. Such a mobile key transmission server 15 may be referred to as a "transmission server" briefly, if necessary.

The mobile key transmission server 15 uses the received vehicle identification information to confirm a target vehicle to which the received authentication number is to be transmitted (S240), and transmits the authentication number to the vehicle corresponding to the vehicle identification information (S242).

Upon receiving the authentication number, a screen indicating that the authentication number has been received is displayed on the display device in the vehicle. When the user inputs the confirmation of receipt or reception of the authentication number into the vehicle by manipulating any physical interface of the vehicle or any virtual interface provided by the display device of the vehicle (S244), the vehicle 16 transmits a message for transmitting the authentication number, which includes the received authentication number to the mobile key management server 12. In this case, it is preferable that the various vehicle information is also included in the authentication number transmission message.

The mobile key management server 12 checks whether the authentication number generated by the server 12 (S236) and transmitted to the mobile key transmission server 15 (S238) matches the authentication number received along with the authentication number transmission message from the vehicle (S248). If the transmitted authentication number matches the received authentication number, the vehicle 16 is authenticated, and for such an authenticated vehicle, the vehicle identification information thereof is also authenticated and combined with the member information and the vehicle information thereof for properly providing the mobile key service. At the same time, the mobile key management server 12 generates and stores a mobile key issuance or generation algorithm corresponding to the authenticated vehicle (S250). The mobile key issuance algorithm is a program or a combination of instructions that is configured to issue or generate the mobile key, upon request. Further, the mobile key is a code configured to authorize the vehicle to unlock the door thereof. The mobile key may include character or numbers and thus has a virtual form unlike a conventional physical key.

In this case, the issuance algorithm for the mobile key may be generated in various ways. For example, the issuance algorithm may be generated based on the received authentication number, based on the vehicle information, or based on the time when the authentication number is received. For these reasons, the algorithms to different vehicles are different from each other. That is, the mobile key issuance algorithm is generated to be unique to each vehicle. In addition, an identifier corresponding to the vehicle may be assigned and the issuance algorithm may be generated based on such an identifier. Meanwhile, by assigning a unique algorithm identifier to the generated algorithm, a mobile key algorithm assigned to each vehicle may be identified using the algorithm identifier.

Additionally, the mobile key management server 12 may transmit the mobile key issuance algorithm to the vehicle 16 (S252), and the vehicle 16 may store the transmitted mobile key algorithm (S254). In this case, by sharing the mobile key issuance algorithm between the mobile key management server 12 and the vehicle 16, the mobile key can be verified not only in the mobile key management server 12 but also in the vehicle 16, if necessary.

Figure 4:
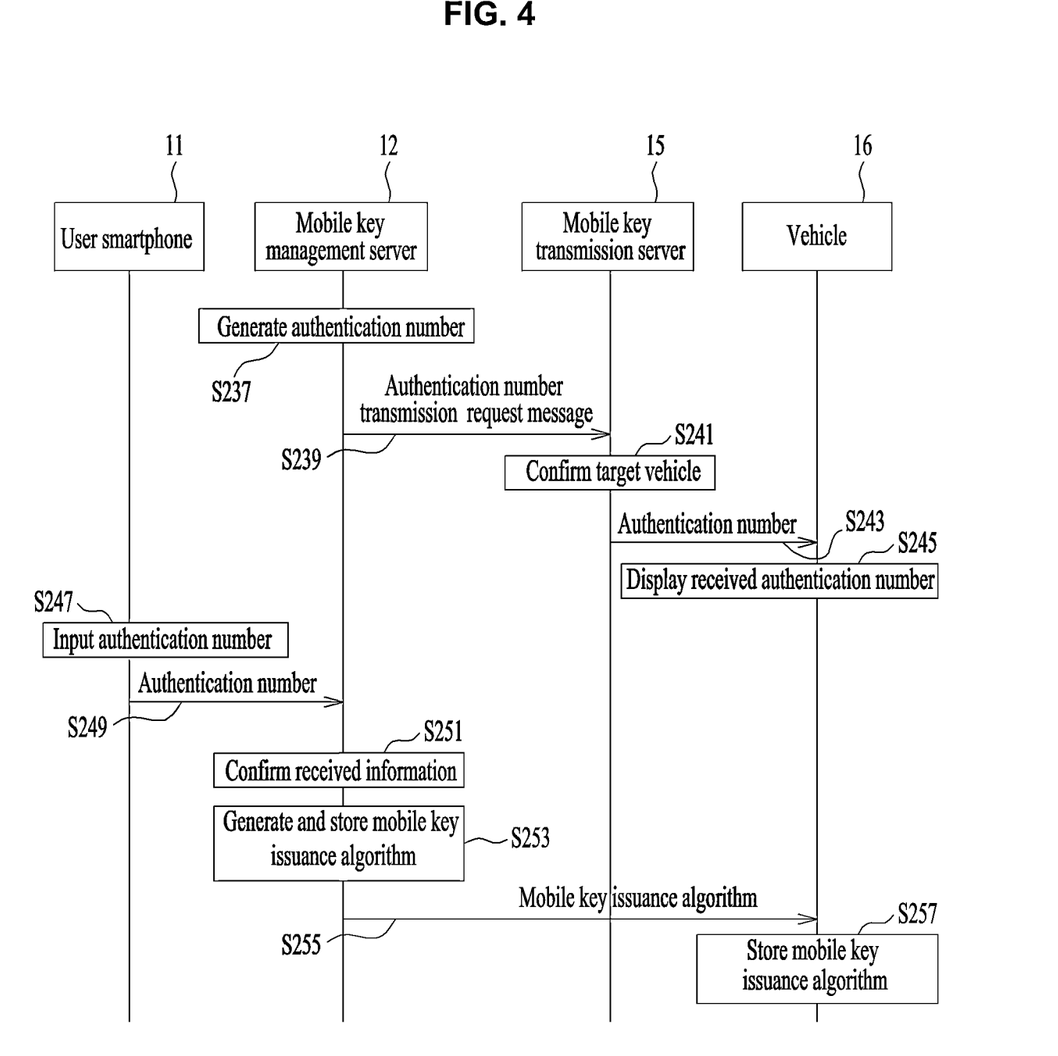
FIG. 4 illustrates a second embodiment of a mobile key service registration method according to the present invention.

FIGS. 2 and 4 illustrate a second embodiment of a mobile key service registration method according to the present invention.

Since the process shown in FIG. 2 is common in both of the first and second embodiments, a process of FIG. 4 performed after the process shown in FIG. 2 will be described below.

As shown in FIG. 4, the mobile key management server 12 that has received the vehicle identification information from the user's smartphone 11 generates an authentication number corresponding to the received vehicle identification information (S237).

When the server 12 transmits a message including a request to transmit the authentication number which includes the generated authentication number and the vehicle identification information, to the mobile key transmission server 15 (S239), the mobile key transmission server 15 confirms a target vehicle to which the received authentication number is to be transmitted, by using the received vehicle identification information (S241), and transmits the authentication number to the vehicle corresponding to the vehicle identification information (S243).

Upon receiving the authentication number, the vehicle 16 displays the received authentication number on the display device therein (S245), and the user enters into the smartphone 11, the authentication number displayed on the display device of the vehicle (S247). Upon entering the authentication number, the smartphone 11 transmits the inputted authentication number to the mobile key management server 12 (S249). Then, the mobile key management server 12 checks whether the authentication number generated by the server 12 (S237) and transmitted to the mobile key transmission server 15 matches the authentication number (S249) received from the smartphone 11 (S251). If the transmitted authentication number matches the received authentication number, the vehicle is authenticated, and the mobile key management server 12 generates and stores a mobile key issuance or generation algorithm corresponding to the authenticated vehicle (S253).

In this case, the issuance algorithm for the mobile key may be generated in various ways. For example, the issuance algorithm may be generated based on the received authentication number, based on the vehicle information, or based on the time when the authentication number is received. In addition, an identifier corresponding to the vehicle may be assigned and the issuance algorithm may be generated based on such an identifier. Meanwhile, by assigning a unique algorithm identifier to the generated algorithm, a mobile key algorithm assigned to each vehicle may be identified using the algorithm identifier.

Additionally, the mobile key management server 12 may transmit the mobile key issuance algorithm to the vehicle 16 (S255), and the vehicle 16 may store the transmitted mobile key issuance algorithm (S257). In this case, by sharing the mobile key issuance algorithm between the mobile key management server 12 and the vehicle 16, the mobile key can be verified not only in the mobile key management server 12 but also in the vehicle 16, if necessary.

Figure 5:
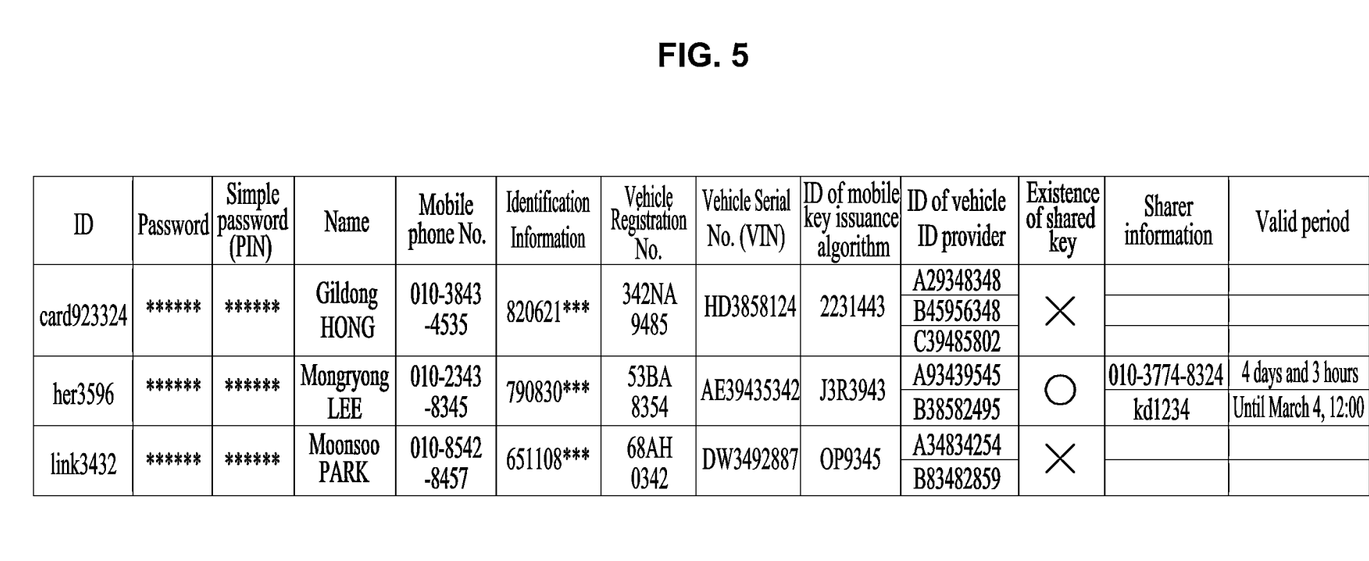
FIG. 5 illustrates an embodiment of information registered in the mobile key management server according to the present invention.

FIG. 5 illustrates an embodiment of information registered in the mobile key management server according to the present invention.

As shown in FIG. 5, according to the user's registration for the mobile key service, the mobile key management server 12 stores information required for issuing and managing the mobile key. A mobile key algorithm ID shown in FIG. 5 is an ID for identifying the mobile key issuance algorithm assigned to each vehicle. An ID of the vehicle ID provider in FIG. 5 means the vehicle identification information which the user's smartphone 11 receives from the vehicle ID provider, and thus such an ID can be described as a vehicle ID which is unique and allows the corresponding vehicle to be distinguished from other vehicles and identified by the servers 12 and 15 for the mobile key service. When the vehicle ID provider is implemented using the NFC method, the vehicle ID provider may be NFC tag and the ID thereof may be the NFC tag ID. The vehicle identification information (i.e., the vehicle ID) provided through the vehicle ID provider may be implanted as the QR code in addition to the NFC method, but is preferably the NFC tag ID in view of user convenience. Further, a plurality of vehicle ID providers and vehicle IDs thereof may exist in a single vehicle, because the vehicle ID providers may be located in various positions at the vehicle such as a driver's door, a passenger's door, and a trunk for user's convenience.

Among the information shown in FIG. 5, the existence of shared key indicates whether the user has designated other users to share the mobile key. If there is a sharer (i.e., a joint owner or a co-owner) for the mobile key, information regarding the sharer and a valid period of mobile key sharing are stored together in the mobile key management server 12.

Figure 6:
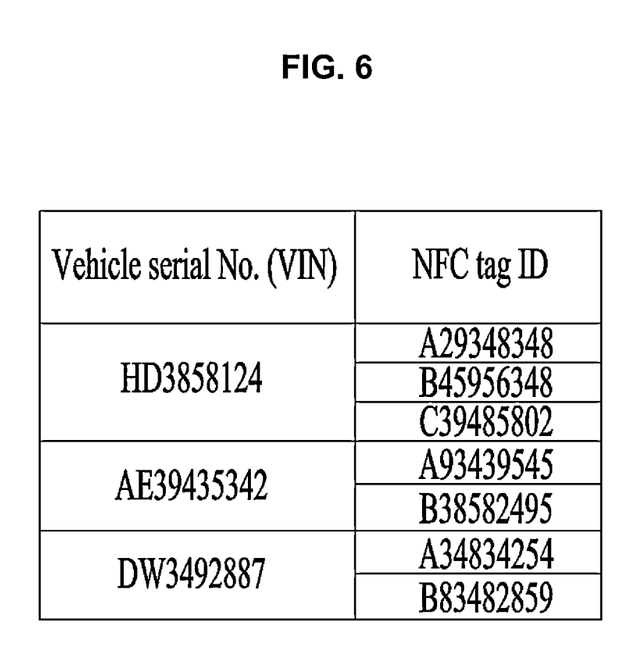
FIG. 6 illustrates an embodiment of information registered in a mobile key transmission server according to the present invention.

FIG. 6 illustrates an embodiment of information registered in a mobile key transmission server according to the present invention.

Since the mobile key transmission server 15 should transmit the authentication number or the mobile key to the corresponding vehicle, the server 15 needs to identify to which vehicle the vehicle ID (i.e., the vehicle identification information) provided by the vehicle ID provider (i.e., the NFC tag ID of the NFC tag) actually corresponds. Therefore, as shown in FIG. 6, the mobile key transmission server 15 includes information indicating the correspondence between a unique code for the vehicle such as a vehicle identification number (VIN) and the NFC tag ID (i.e., the vehicle identification information). The VIN is a unique code, including a serial number, used by the automotive industry to identify individual vehicles. The VIN is also called a chassis number or frame number)

Figure 7:
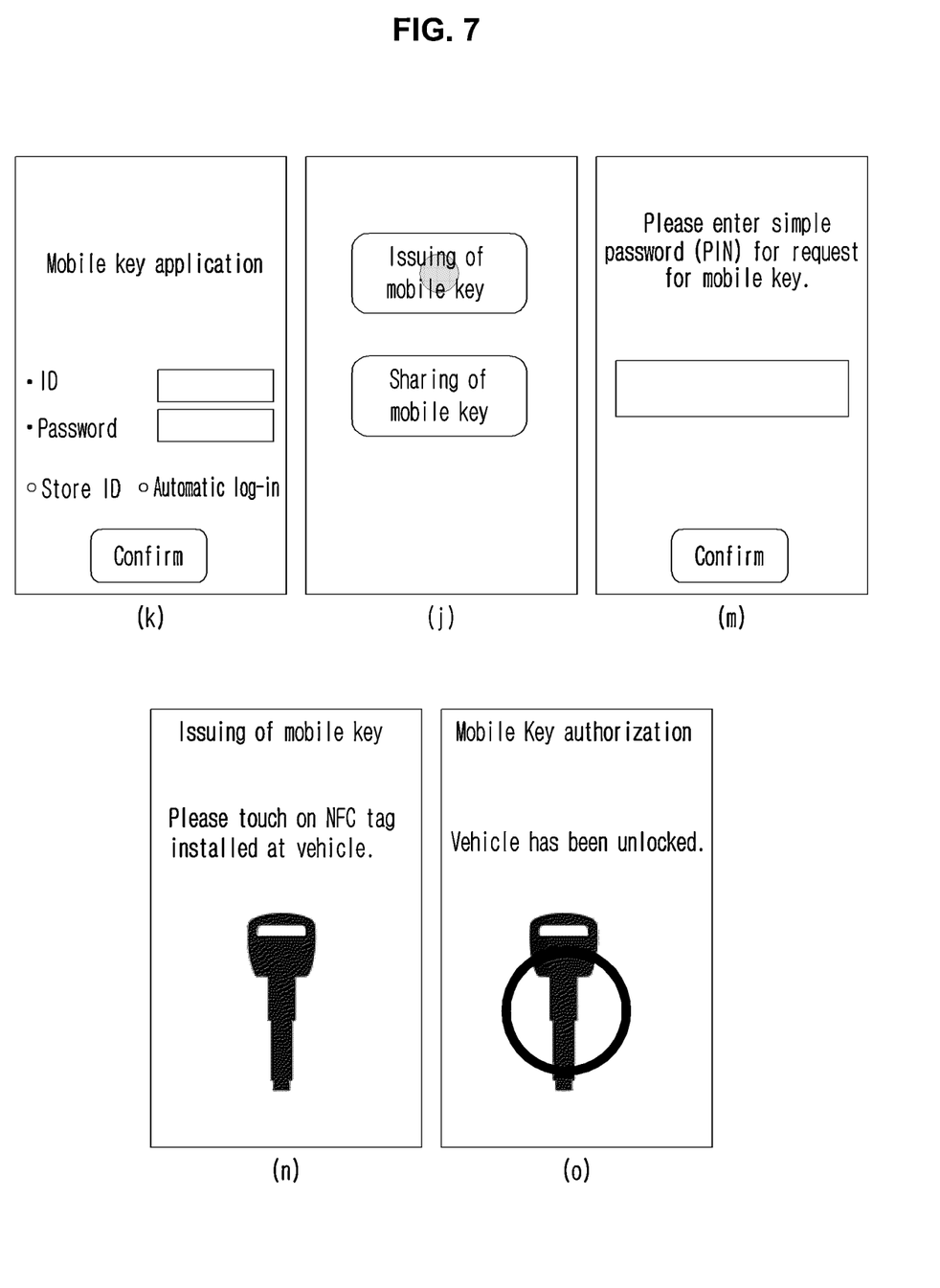
FIG. 7 illustrates an embodiment showing a screen of a user's smartphone in a process for using a mobile key according to the present invention.

FIG. 7 illustrates an embodiment showing a screen of a user's smartphone in a process for using a mobile key according to the present invention.

When the user wishes to unlock the door using the user's smartphone 11, the mobile key application installed in the smartphone 11 is first executed (FIG. 7(*k*)). When a user ID and a password are entered in the executed mobile key application, a screen to select issuing of the mobile key or sharing of the mobile key is displayed (FIG. 7(*l*)).

When the user selects a button for mobile key issuance, a screen requiring the PIN, an additional password which has been separately set up for the issuance of the mobile key is displayed (FIG. 7(*m*)). When the user enters the PIN, the smartphone 11 displays a screen for guiding the user to approach the smartphone 11 to the vehicle ID provider (i.e., the NFC tag) installed at the vehicle in order to issue the mobile key (FIG. 7(*n*)).

In this embodiment, the PIN is adopted for user authentication, but the user authentication using the user's biometric information, such as fingerprint recognition and iris recognition, may be applied.

When the user approaches the smartphone 11 to the vehicle ID provider, the door lock of the vehicle is released, and a message indicating that the vehicle door has been unlocked is displayed on the user's smartphone 11(*o*).

Figure 8:
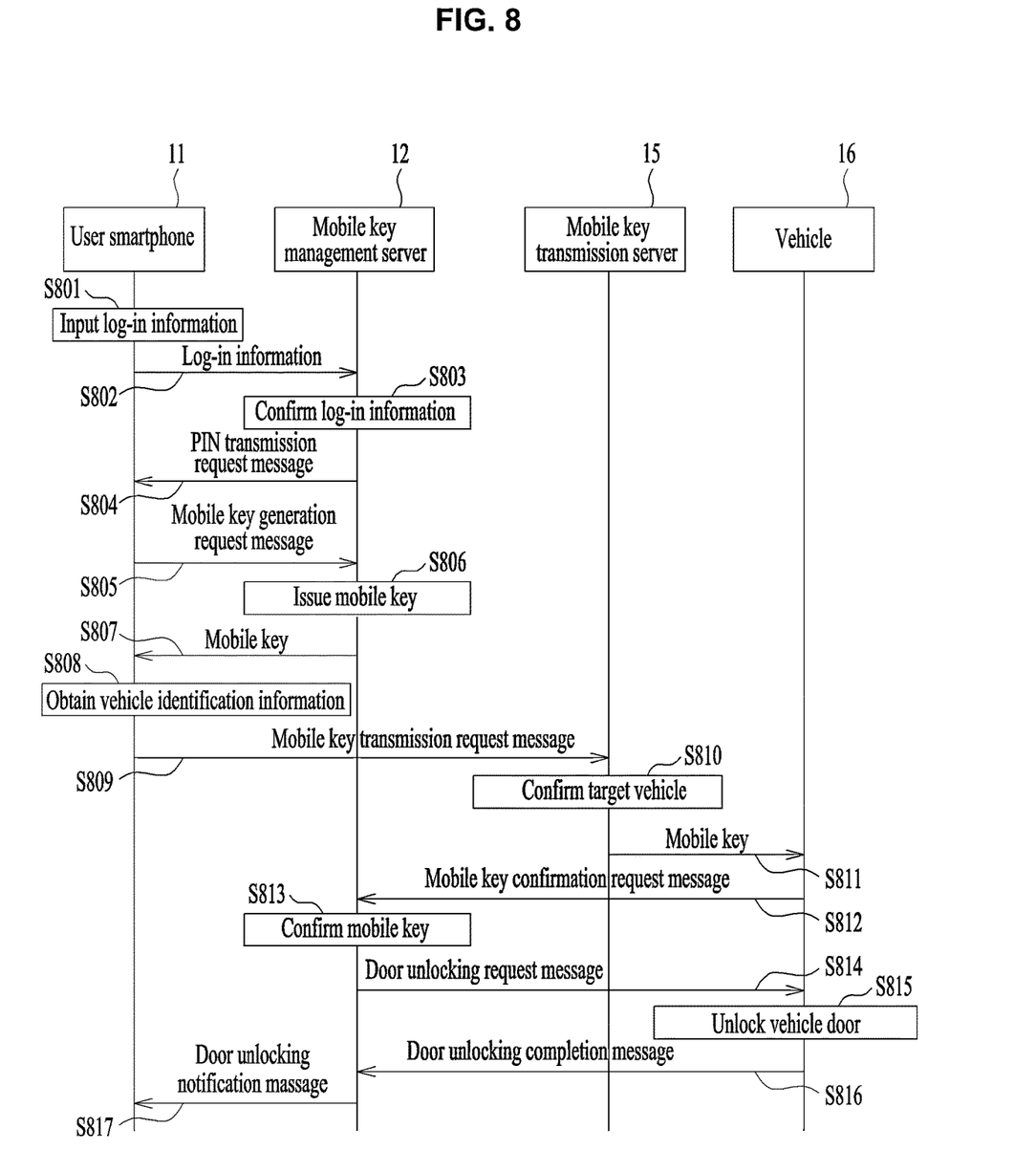
FIG. 8 illustrates an embodiment of a process for using a mobile key according to the present invention.

FIG. 8 illustrates an embodiment of a process for using a mobile key according to the present invention.

When the user inputs log-in information via the user's smartphone 11 (S801), the inputted or entered log-in information is transmitted to the mobile key management server 12 (S802). When the mobile key management server 12 confirms the received log-in information (S803), the mobile key management server 12 transmits a message including a request to transmit the PIN to the user's smartphone 11 (S804).

When the user inputs the PIN into the user's smartphone 11, the user's smartphone 11 transmits a message including a request to generate the mobile key along with the PIN to the mobile key management server 12 (S805). The mobile key management server 12 checks whether the received PIN matches the stored PIN and generates the mobile key using the mobile key issuance algorithm in the server 12 which has been assigned to the user's authenticated smartphone and/or the corresponding authenticated vehicle (S806). The mobile key issuance algorithm may issue different mobile keys each time the smartphone 11 requests the mobile key to unlock the door. Therefore, the issued mobile key is a disposable or one-time passcode which enhances the security of the mobile key service.

The mobile key management server 12 transmits the generated mobile key to the user's smartphone 11 (S807), and the user approaches the smartphone 11 to the vehicle ID provider installed to the vehicle according to the guide displayed on the smartphone 11 (FIG. 7(*n*)).

The user smartphone 11 obtains the vehicle identification information (i.e., the vehicle ID, specifically the NFC tag ID) from the vehicle ID provider (S808), and transmits to the mobile key transmission server 15, a message including a request to transmit the mobile key along with the obtained vehicle identification information and the mobile key to the mobile key transmission server 15 (S809).

The mobile key transmission server 15 uses the vehicle identification information included in the mobile key transmission request message to confirm the target vehicle to which the mobile key is to be transmitted (S810), and transmits the mobile key to the corresponding vehicle identified by the vehicle identification information (S811).

Upon receiving the mobile key, the vehicle 16 that has received the mobile key may simply unlock the door of the vehicle. Alternatively, the vehicle 16 may verify the received mobile key using the mobile key issuance algorithm which has been assigned by the management server 12 and then stored in the vehicle 16. More specifically, the vehicle 16 generates a mobile key using the mobile key issuance algorithm stored therein, and compares the generated mobile key with the received mobile key. If the received mobile key matches the generated mobile key the vehicle 16 may unlock the door of the vehicle 16.

Meanwhile, the validity of the mobile key may be checked by transmitting the received mobile key to the mobile key management server 12. That is, upon receiving the mobile key, the vehicle 16 transmits a message including a request to confirm the mobile key, along with the received mobile key (S812), and the mobile key management server 12 may check whether the mobile key (S806) generated by the server 12 is the same as the mobile key (S812) received from the vehicle 16 (S813).

When the received mobile key matches the mobile key generated by the mobile key management server 12, the mobile key management server 12 transmits a message including a request to unlock the door to the vehicle 16 (S814), and the vehicle 16 unlocks the door upon receiving such a message (S815).

Additionally, the vehicle 16 that has unlock the door transmits a message informing of unlocking of the door to the mobile key management server 12 (S816), and the server 12 transmits to the user's smartphone 11, a message notifying of the unlocking of the door (S816). Upon receiving the unlocking notification message, the user's smartphone 11 may display a screen indicating that the door of the vehicle has been unlocked (FIG. 7(o)).

Figure 9:
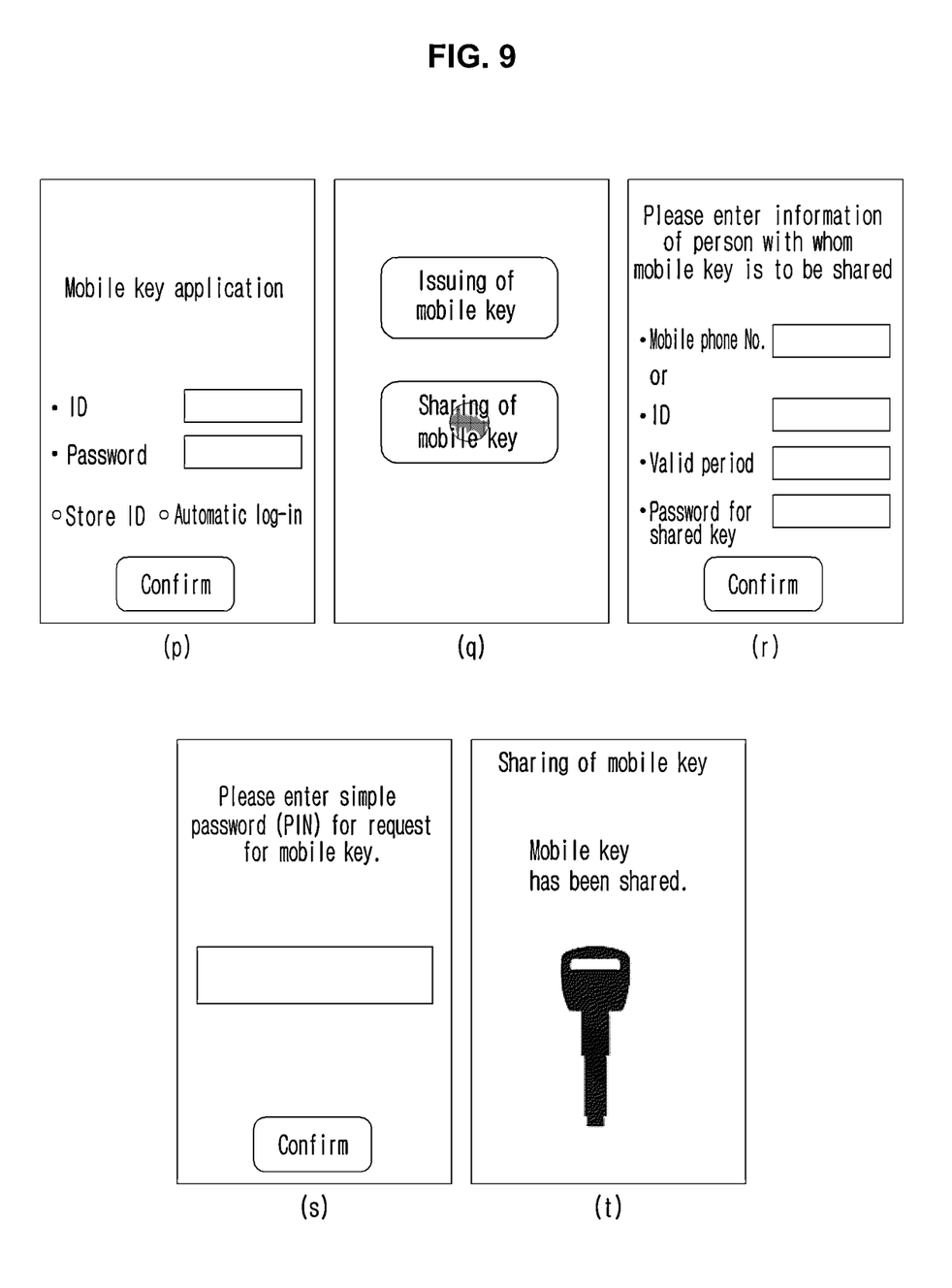
FIG. 9 illustrates an embodiment showing a screen of a user's smartphone in a process of mobile key sharing according to the present invention.

FIG. 9 illustrates an embodiment showing a screen of a user's smartphone in a process of mobile key sharing according to the present invention.

When the user wishes to share a mobile key for the vehicle with other persons, the mobile key application installed in the smartphone 11 is first executed (FIG. 9(p)). When a user ID and a password are entered in the executed mobile key application, a screen to select issuing of the mobile key or sharing of the mobile key is displayed (FIG. 9(q)).

When the user selects a button for mobile key sharing, a screen requiring information of the sharer, specifically a candidate with whom the mobile is to be shared, is displayed (FIG. 9(r)). When the user enters the required information regarding the sharer, the smartphone 11 displays a screen for entering the PIN (FIG. (s)). When the user enters the PIN, the smartphone 11 displays a screen for informing that the mobile key of the user has been shared with the designated person (FIG. 9(t)).

Figure 10:
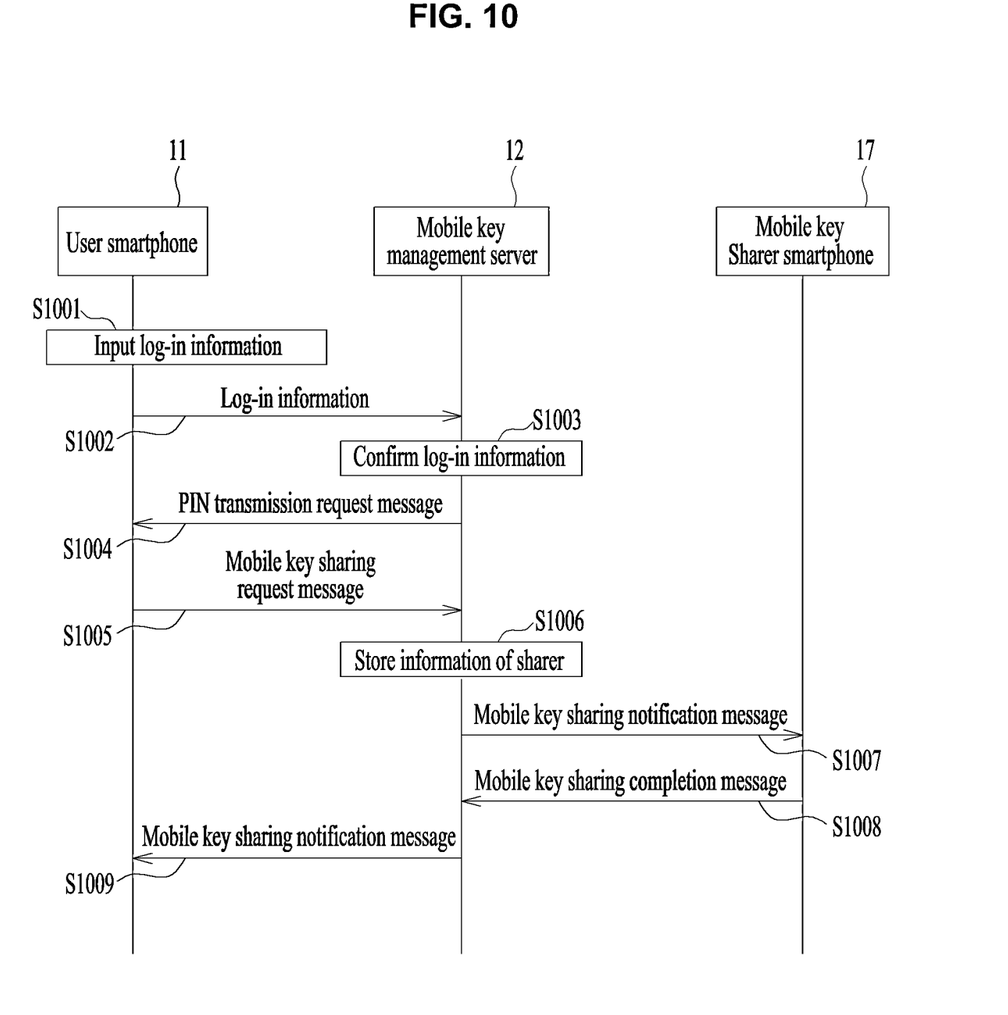
FIG. 10 illustrates an embodiment showing a process of mobile key sharing according to the present invention.

FIG. 10 illustrates an embodiment showing a process of mobile key sharing according to the present invention.

When the user inputs the log-in information via the user's smartphone 11 for sharing the mobile key (S1001), the user's smartphone 11 transmits the log-in information to the mobile key management server 12 (S1002). When the mobile key management server 12 confirms the log-in information (S1003), the server 12 transmits a PIN transmission request message to the user's smartphone 11 (S1004). Upon receiving such a message, the user transmits to the mobile key management server 12 via the smartphone 11, a message including a request to share the mobile key, along with the information of the sharer and the PIN (S1005).

The mobile key management server 12 confirms whether the received PIN matches the stored PIN, and updates the information stored or registered in the server 12. That is, the mobile key management server 12 updates and stores the existence of the shared key, the sharer information, the period for which the shared key is valid (S1006).

Referring to the stored information of the sharer, the mobile key management server 12 transmits to a smartphone 17 of the sharer a message notifying that the mobile key has been successfully shared with the sharer (S1007). Further, the mobile key management server 12 receives a mobile key sharing completion message from the smart phone of the sharer 17 (S1008), and also transmits to the user's mobile terminal 11, a message notifying that the mobile key has been successfully shared with the sharer (S1008).

When the information of the sharer is registered in the mobile key management server 12, the mobile key sharer can unlock the vehicle door using the smartphone 17 according to the method shown in FIG. 8. Further, once the predetermined period for which the shared mobile key expires, the mobile key management server 12 may generate a new different mobile key issuance algorithm. The mobile key management server 12 also stores the new algorithm and transmits the new algorithm to the vehicle for verifying the issued mobile key as discussed above, to enhance the security of the mobile key service.

Although a number of examples have been described, it should be understood that other modifications and implementations can be devised by those skilled in the art that will fall within the spirit and scope of the principles of the present invention. More particularly, various variations and modifications in the structure or the configuration are possible within the scope of the disclosure, the drawings and the appended claims. In addition to variations and modifications in the configuration, alternative uses will also be apparent to those skilled in the art.

The invention claimed is:

1. A method for unlocking a vehicle door using a mobile terminal, the method comprising:
   authenticating, by a mobile key management server, a user and a smartphone of the user;
   authenticating, by the mobile key management server, a vehicle having a door to be unlocked;
   generating, by the mobile key management server, a mobile key issuance algorithm corresponding to the authenticated vehicle and smartphone;
   issuing, by the mobile key management server, a mobile key, using the generated mobile key issuance algorithm, in response to a request from the smartphone;
   receiving, at the mobile key management server, the issued mobile key via the smartphone and the vehicle; and
   requesting, by the mobile key management server, the vehicle to unlock the door thereof, when the mobile key management server confirms that the issued mobile key matches the received mobile key.

2. The method of claim 1, wherein the mobile key comprises a virtual code configured to authorize the vehicle to unlock the door thereof.

3. The method of claim 1, wherein the mobile key issuance algorithm is generated to be unique to the vehicle, based on information related to authentication of the vehicle.

4. The method of claim 1, wherein the receiving of the issued mobile key includes:
   transmitting, by the mobile key management server, the issued mobile key to the smartphone of the user;
   transmitting, via a mobile key transmission server, the mobile key received at the smartphone to the vehicle; and
   redirecting, by the vehicle, the mobile key received at the vehicle to the mobile key management server.

5. The method of claim 4, wherein the transmitting of the mobile key received at the smartphone includes:
   obtaining, by the smartphone, vehicle identification information which is unique to distinguish the vehicle from other vehicles from the vehicle;
   transmitting, by the smartphone, the vehicle identification information and the received mobile key to the mobile key transmission server; and
   identifying, by the mobile key transmission server, the vehicle, using the vehicle identification information and transmitting the mobile key to the identified vehicle.

6. The method of claim 5, wherein the obtaining of the vehicle identification information comprises obtaining the vehicle identification information from a vehicle ID provider installed at the vehicle.

7. The method of claim 6, wherein the vehicle ID provider is configured to transmit the vehicle identification information, in response to a predetermined manipulation on the smartphone.

8. The method of claim 7, wherein the vehicle ID provider comprises a NFC tag configured to transmit the vehicle identification information to the smartphone when the smartphone approaches thereto.

9. The method of claim 1, further comprising:
transmitting, by the mobile key management server, the issued mobile key to the vehicle via the smartphone; and
unlocking by the vehicle, the door thereof, upon receiving the transmitted mobile key.

10. The method of claim 1, further comprising transmitting, by the mobile key management server, the generated mobile key issuance algorithm to the vehicle.

11. The method of claim 10, further comprising:
transmitting, by the mobile key management server, the issued mobile key to the vehicle via the smartphone;
verifying, by the vehicle, the transmitted mobile key using the transmitted mobile key issuance algorithm; and
When the transmitted mobile key is verified, unlocking, by the vehicle, the door thereof.

12. The method of claim 11, wherein the verifying of the transmitted mobile key includes:
generating, by the vehicle, a mobile key using the transmitted mobile key issuance algorithm; and
confirming, by the vehicle, whether the generated mobile key matches the transmitted mobile key.

13. A method for unlocking a vehicle door using a mobile terminal, the method comprising:
authenticating, by a mobile key management server, a user and a smartphone of the user;
authenticating, by the mobile key management server, a vehicle having a door to be unlocked;
issuing, by the mobile key management server, a mobile key, using a mobile key issuance algorithm, in response to a request from the smartphone;
receiving, at the mobile key management server, the issued mobile key via the smartphone and the vehicle; and
requesting, by the mobile key management server, the vehicle to unlock the door thereof, when the mobile key management server confirms that the issued mobile key matches the received mobile key.

14. The method of claim 13, wherein the mobile key comprises a virtual code configured to authorize the vehicle to unlock the door thereof.

15. The method of claim 13, wherein the receiving of the issued mobile key includes:
transmitting, by the mobile key management server, the issued mobile key to the smartphone of the user;
transmitting, via a mobile key transmission server, the mobile key received at the smartphone to the vehicle; and
redirecting, by the vehicle, the mobile key received at the vehicle to the mobile key management server.

16. The method of claim 15, wherein the transmitting of the mobile key received at the smartphone includes:
obtaining, by the smartphone, vehicle identification information which is unique to distinguish the vehicle from other vehicles from the vehicle;
transmitting, by the smartphone, the vehicle identification information and the received mobile key to the mobile key transmission server; and
identifying, by the mobile key transmission server, the vehicle, using the vehicle identification information and transmitting the mobile key to the identified vehicle.

17. The method of claim 16, wherein the obtaining of the vehicle identification information comprises obtaining the vehicle identification information from a vehicle ID provider installed at the vehicle.

18. The method of claim 17, wherein the vehicle ID provider is configured to transmit the vehicle identification information, in response to a predetermined manipulation on the smartphone.

19. The method of claim 18, wherein the vehicle ID provider comprises a NFC tag configured to transmit the vehicle identification information to the smartphone when the smartphone approaches thereto.

20. The method of claim 1, wherein the mobile key issuance algorithm is assigned to the authenticated smartphone and the authenticated vehicle in advance.

* * * * *